3,018,270
PROCESS FOR PRODUCING SILICONE RESINS
John B. Toogood, Tonawanda, N.Y., assignor to Union
Carbide Corporation, a corporation of New York
No Drawing. Filed July 28, 1960, Ser. No. 45,782
11 Claims. (Cl. 260—46.5)

This invention relates to an improved process for producing silicone resins. More particularly, this invention is concerned with an improved process for producing thermosetting silicone resins of controlled hydroxyl content.

This application is a continuation-in-part application of application Serial No. 738,302, by John B. Toogood, entitled "Process for Producing Silicone Resins," filed May 28, 1958, and now abandoned.

Thermosetting silicone resins are characterized by a three-dimensional molecular structure of alternating silicon and oxygen atoms, having hydrocarbon and hydroxyl substituents on the silicon atoms. Usually the hydrocarbon radicals are present in average amounts of from about 0.5 to about 1.9 hydrocarbon radicals per silicon atom, and the hydroxyl radicals are present in amounts of from about 1 to about 4.0 percent by weight of resin.

The preparation of thermosetting silicone resins is known in the art. These resins are usually prepared by the hydrolysis and controlled condensation of one or more hydrolyzable silanes. However, when silicone resins are prepared in this manner, considerable difficulty is encountered in controlling the reaction in order to obtain a resin having a desired degree of condensation and of hydroxyl content. Thus, if the reaction is allowed to proceed too far, excessive condensation occurs and the resin gels in the reaction vessel; if the reaction is stopped too soon, the resin exhibits poor handling, drying and curing properties.

Accordingly, the principal object of this invention is to provide a new and improved process for preparing thermosetting silicone resins.

A specific object of this invention is to provide an improved process for preparing thermosetting silicone resins which obviates the processing difficulties encountered in prior art techniques of hydrolyzing and condensing a silicone hydrolyzate to a predetermined silanol content. Thus, the present invention provides an improved way for preparing thermosetting silicone resins having a predetermined silanol content which avoids the difficulties involved in stopping a condensation reaction at a point at which the resin has a desired hydroxyl content, said point being hereinafter referred to as the critical end point.

A still further object of this invention is to provide a process for preparing thermosetting silicone resins which yields reproducible resin products of predetermined silanol content. By my process, a greater uniformity in the properties of the resin can be obtained in commercial production thereof.

In accordance with this invention, thermosetting silicone resins of controlled silanol content are prepared by a two-stage process comprising: (1) hydrolysis and condensation of one or more hydrolyzable silanes to a partially condensed hydroxy-containing silicone hydrolyzate, and (2) reacting said hydrolyzate and water under heat and pressure, with or without the presence of a catalyst, to simultaneously condense the silanol groups of said hydrolyzate to form Si—O—Si bonds, and hydrolytically cleave the Si—O—Si bonds of said hydrolyzate to form Si—OH bonds while controlling the conditions of the reaction so that at equilibrium a resin of predetermined silanol content is obtained. My process of preparing silicone resins represents a considerable improvement over conventional prior art processes inasmuch as the second stage of my process can be allowed to proceed to a point of equilibrium. Thus, by carefully selecting the concentration of reactants and the conditions at which they are reacted, it is possible to obtain a resin of predetermined silanol content without stopping the reaction at a critical end point.

The starting materials employed in my process are the organo-substituted hydrolyzable silanes. However, limited amounts of hydrolyzable silanes containing no organic groups, such as silicon tetrachloride, or trichlorosilane, may also be employed.

The hydrolyzable silanes employed are preferably chlorosilanes, since they are cheaper and more readily available. However, other hydrolyzable silanes, such as alkoxy silanes, may also be employed as starting materials.

Although I prefer to employ methyl-, phenyl-, and methylphenyl-substituted hydrolyzable silanes as starting materials, it will be obvious to those skilled in the art that the starting silanes may contain hydrocarbon radicals other than methyl and phenyl, such as ethyl, propyl, tolyl, xylyl, benzyl, phenylethyl, naphthyl and the like, as well as substituted hydrocarbon radicals, such as halo-substituted hydrocarbon radicals, amino-substituted hydrocarbon radicals, cyano-substituted hydrocarbon radicals and the like. However, the preferred starting materials are the methyl-, phenyl-, and methylphenyl-chlorosilanes, such as methyltrichlorosilane, phenyltrichlorosilane, dimethyldichlorosilane, diphenyldichlorosilane, methylphenyldichlorosilane and the like.

By suitably selecting and proportioning the starting materials, it is possible to control the ratio of organic radicals to silicon atoms (R/Si ratio) in the final product. The preferred R/Si ratio will differ depending upon the particular types of organic radicals incorporated into the resin. In general, the ratio may vary from as low as 0.5 to as high as 1.9. When a silicone resin containing only methyl and phenyl radicals is desired, the ratio of R/Si should be maintained between approximately 1.0 and 1.9, preferably between 1.0 and 1.7, in order to impart optimum properties to the resin.

The first step of my process comprises hydrolyzing and condensing one or more hydrolyzable silanes to a partially condensed hydroxyl-containing silicone hydrolyzate by any of the various techniques known in the art. However, whereas careful controls must be applied when employing these prior art techniques in order to stop the reaction at a critical end point and thereby produce a resin having a desired hydroxyl content, according to the process of my invention the hydrolysis is allowed to proceed with no special care being taken to carry the reaction to a critical end point.

Although various techniques may be employed to prepare a partially condensed hydroxy-containing silicone hydrolyzate, I prefer to employ either of two well-known hydrolysis techniques commonly employed in the art, namely, either the "limited water" or "excess water" technique.

When employing the "excess water" technique, a mixture of hydrolyzable silanes, preferably chlorosilanes, in suitable proportion, is added to an agitated mixture of water (present at least in a stoichiometric amount) and a solvent in which the hydrolyzate is soluble, such as isopropyl ether. The overall reaction is exothermic, and when lower boiling solvents are employed, the reaction system is preferably cooled to prevent loss of solvent and solvent-entrained monomers by boiling. For example, when isopropyl ether is employed as solvent, the temperature is preferably maintained below 52° C.

After addition of the silanes is completed, the mixture is allowed to settle into two phases. When the silanes employed are chlorosilanes, and isopropyl ether is employed as solvent, the upper phase will contain a solution of silicone hydrolyzate in isopropyl ether, while the lower phase will contain a solution of HCl in water. In such case, isopropyl ether is preferably employed in an amount calculated to give a maximum theoretical resin solids (resin solids obtained on fully condensing the resin) concentration in solution at the completion of hydrolysis of about 31 weight-percent, and water is preferably employed in an amount calculated to give a maximum concentration of HCl in solution at the completion of hydrolysis of about 28 weight-percent. Higher concentrations of HCl may result in gelation of the silicone resin, while at higher concentrations than approximately 31 weight-percent theoretical resin solids in the solvent, the specific gravity of the isopropyl ether solution approximates that of water, causing extremely slow separation of the two phases after hydrolysis and during subsequent washings with water.

When employing the "limited water" technique, a mixture of hydrolyzable silanes, preferably chlorosilanes, in suitable proportion, are dissolved in a suitable solvent, such as isopropyl ether, and the resulting solution agitated while water is added. As the reaction is endothermic under these conditions, the temperature is preferably maintained between approximately 25° C. and 35° C. by heating. When isopropyl ether is employed as solvent, it is preferably employed in an amount calculated to give a maximum theoretical resin solids concentration in solution at the completion of hydrolysis of about 45 weight-percent. Water is preferably employed in an amount of about 10 percent excess over the stoichiometric amount required for complete hydrolysis of the silanes. After the addition of water is complete, isopropyl ether is added in an amount calculated to give about a 31 weight-percent maximum theoretical resin solids concentration in solution, the maximum solids concentration which permits easy washings with water.

While I prefer to employ isopropyl ether as solvent in the first stage of my process, in general, the solvent employed is not critical, and any inert solvent can be advantageously employed. By an inert solvent I mean a solvent which is non-reactive with the silicone hydrolyzate. For example, ethers, such as isopropyl ether, ethyl ether and the like, esters, such as butyl acetate, ethyl acetate and the like, ketones, such as dimethylketone, diethylketone and the like, aliphatic hydrocarbons, such as "Solvesso 150" (mixture of high boiling aliphatic hydrocarbons prepared by the Standard Oil Co.) and the like, aromatic hydrocarbons, such as benzene, toluene and the like, and various mixtures thereof can be advantageously employed.

In order to insure consistent, reproducible results, it is necessary to neutralize the hydrolyzate before proceeding to the second stage of my process. Thus, whenever the silicone hydrolyzate has been prepared by the hydrolysis of chlorosilanes, it is necessary to remove residual HCl. This may usually be accomplished by first washing the solvent phase with water and then adding a small amount of water to the hydrolyzate solution, preferably in an amount of from approximately 2 to 3 weight-percent of theoretical resin solids in solution, and refluxing the solution. The refluxing time will vary with the solvent and the composition of the resin, but refluxing times of approximately 30 minutes have been found generally satisfactory. Excess water may then be removed by distilling the mixture until no more water is present in the azeotropic distillate. This procedure may be repeated, if necessary, until the distillate is acid free.

If desired, the solution may be stripped of solvent and the remaining hydrolyzate resolvated in another solvent for use in the second stage of my process. In the case of isopropyl ether, stripping may be accomplished by heating the solution at about 130° C. If the solvent employed in the first stage of my process is also suitable for use in the second stage, stripping is unnecessary.

The second stage of my process comprises heating a solution of a partially condensed hydroxyl-containing silicon hydrolyzate prepared in accordance with stage one of my process, with or without a catalyst, under increased pressure in the presence of water in order to produce a resin having a desired silanol content by simultaneously condensing the silanol groups of said hydrolyzate to form Si—O—Si bonds, and hydrolytically cleaving the Si—O—Si bonds of said hydrolyzate to form Si—OH bonds until a state of equilibrium has been attained.

An important feature of this stage is that the reaction may be allowed to continue until a condition of equilibrium has been attained, thus obviating the need for a critical end point. The time required to attain equilibrium, as well as the silanol content of the resin at equilibrium, will vary with the system, being related to such variables as temperature, pressure, nature and concentration of solvent, nature and concentration of catalyst, nature of the resin employed, and the amount of water employed. The time required to attain equilibrium under a given set of conditions is generally less that twelve hours, and may be determined empirically by evaluating resins prepared by arresting the reaction at differing time intervals.

In order to effect the equilibrium condensation and hydrolytic cleavage of a partially condensed hydroxyl-containing silicone hydrolyzate according to the second stage of my process, the use of a solvent is necessary. In general, the solvent employed is not critical, and any inert solvent can be advantageously employed. By an inert solvent I mean a solvent which is non-reactive with the silicone hydrolyzate. For example, ethers, such as isopropyl ether, ethyl ether and the like, esters, such as butyl acetate, ethyl acetate and the like, ketones, such as dimethylketone, diethylketone and the like, aliphatic hydrocarbons, such as "Solvesso 150" and the like, aromatic hydrocarbons, such as benzene, toluene and the like, and various mixtures thereof can be advantageously employed. However, for optimum results, it is preferable to employ toluene in the second stage of my process.

Thus, it will be apparent to those skilled in the art that various solvents commonly used in the first stage of my process may also be advantageously employed in the second stage of my process. Indeed, by a suitable selection of solvent, it is possible to employ a singe solvent in both stages of my process, as well as in the application of the final resin. Thus, the need for solvent exchanging prior to the various stages of my process, and prior to the application of the final resin, may be eliminated by employing such solvents as toluene, xylene and the like, throughout my entire process.

The amount of solvent employed in the second stage of my process depends to a large extent upon the particular solvent used and the results desired. For example, when toluene is employed as solvent, as is preferred, it can be advantageously employed in amounts calculated to give concentration of hydrolyzate in solution ranging from about 40 weight-percent to about 70 weight-percent. Concentrations of hydrolyzate both greater and less than the disclosed range can also be employed; however, no commensurate advantage is obtained thereby.

In order to effect the equilibrium condensation and hydrolytic cleavage of a partially condensed hydroxyl-containing silicone hydrolyzate according to the second stage of my process, both heat and pressure are necessary. While the temperature and pressure employed depend to a large extent on the other reaction conditions and the results desired, a minimum temperature of about 150° C. and a minimum pressure of about 400 p.s.i. are generally necessary for satisfactory results. Usually temperatures above 300° C., and pressures above 20,000 p.s.i., are unnecessary, and preferably temperatures of from 260° C. to 280° C., and pressures of from 700 p.s.i. to 1500 p.s.i., are employed.

It will be obvious to those skilled in the art that while temperature and pressure may be separately controlled by effecting reaction in a continuous reactor, when reaction is effected in a sealed pressure vessel, such as an autoclave, temperature and pressure are interrelated, with increased temperature causing increased pressure.

The amount of water employed in the second stage of my process depends to a large extent upon the results desired. Generally, an amount of water ranging from about $1/11$ to about $1/4$ of the weight of hydrolyzate present, preferably from about $1/10$ to about $1/8$ of the weight of hydrolyzate present, can be advantageously employed. Most preferably, water is employed in an amount of about $1/10$ of the weight of hydrolyzate present.

If desired, ammonia may be employed as catalyst in the final stage of my process. When ammonia is employed as catalyst, it is usually employed in an amount not exceeding one weight-percent, preferably not exceeding 0.5 weight percent, of the hydrolyzate present. For convenience, ammonia may be employed as a 10 weight-percent aqueous solution in an amount not exceeding 10 weight-percent, preferably not exceeding 5 weight-percent, of the hydrolyzate present.

After equilibrium has been attained, the solution must be neutralized. This may be accomplished by the addition of an appropriate acid. Excess water may be removed by distilling the mixture until no more water is present in the azeotropic distillate. If desired, the solvent may be stripped and the resin resolvated in another solvent prior to application.

The silicone resins prepared in accordance with my process are useful as electrical insulating resins. They may be applied in solution with a suitable curing catalyst by such techniques as dipping, spraying and brushing. Curing and solvent removal are then effected by heating. Any solvent well known in the art for applying thermosetting silicone resins may be employed in applying the resin, such as toluene, xylene, "Solvesso 150" and the like. Curing may be effected by the use of curing catalysts well known in the art, such as the octasols and naphthenates of cobalt, zinc, lead and the like, and similar salts.

Silicone resins prepared according to my process exhibit improved properties over silicone resins prepared by previous methods, including faster drying times, improved moisture resistance, and increased thermal stability. When these resins are produced without the use of a catalyst in the second stage of my process, they possess optimum thermal, electrical and cure properties when the reaction conditions are so chosen as to yield a final resin having a hydroxyl content of from about 0.25 to about 3.0 weight-percent, preferably from about 1.0 to about 2.0 weight-percent. When ammonia is employed as catalyst in the second stage of my process, these resins possess optimum thermal, electrical and cure properties when the reaction conditions are so chosen as to yield a final resin having a hydroxyl content of from about 0.25 to about 2.0 weight-percent, preferably from about 0.4 to about 1.0 weight-percent.

It will be apparent to one skilled in the art that certain variations and modifications in the above description may be effected without departing from the spirit of the present invention. The following examples of my invention are set forth for purposes of illustration so that those skilled in the art may better understand my invention, and it should be understood that they are not to be construed as limiting my invention. The dielectric strengths set forth in the examples were determined in accordance with ASTM test D—1346—56T. The symbols Me and Ph as used in the examples stand for methyl and phenyl respectively.

*Example I*

A silane charge having the following composition: dimethyldichlorosilane, 232 grams; diphenyldichlorosilane, 50.5 grams; methyltrichlorosilane, 89.5 grams; phenyltrichlorosilane, 296 grams (R/Si ratio, 1.500; phenyl/methyl ratio, 0.428), was hydrolyzed according to the "excess water" technique by adding said charge to a mixture of 1200 ml. of isopropyl ether and 1200 ml. of water, with the temperature being maintained below 52° C. The hydrolyzate-containing ether phase was then separated from the aqueous-HCl phase. The ether phase was washed three times with 300 ml. of water to neutrality, and then stripped of solvent by heating to 130° C. 70 grams of toluene were then added to the hydrolyzate to yield a 51.3 weight-percent solution of theoretical resin solids.

156 grams of the resin solution and 15 grams of water were then charged to a 300 ml. steel autoclave. The autoclave was sealed and heated at 270° C. (pressure: 1000 p.s.i.) for 12 hours. Following this, the autoclave was drained and excess water and toluene stripped to yield a resin solution having the following properties:

Solids content _____ weight-percent __ 70.0
Viscosity, 25° C _____ c.p.s __ 38
OH content of resin _____ weight-percent __ 1.80

A sample resin solution catalyzed with 0.1 weight-percent cobalt (as cobalt octasol) and 0.15 weight-percent 8-hydroxyquinoline of resin solids dried tack-free after heating for 4 hours at 150° C. A glass tape of 8 to 8.5 mils thickness on which the catalyzed silicone resin solution was impregnated and cured retained a dielectric strength greater than 1000 volts/ml. on both straight and bent sections of the tape after aging 14 days at 275° C. The catalyzed resin solution had a shelf life at 50° C. of 34 days.

*Example II*

A silane charge having the following composition: dimethyldichlorosilane, 232 grams; diphenyldichlorosilane, 50.5 grams; methyltrichlorosilane, 89.5 grams; phenyltrichlorosilane, 296 grams (R/Si ratio, 1.500; phenyl/methyl ratio, 0.428), was hydrolyzed according to the "excess water" technique by adding said charge to a mixture of 1200 ml. of isopropyl ether and 1200 ml. of water, with the temperature being maintained below 52° C. The hydrolyzate-containing ether phase was then separated from the aqueous-HCl phase. The ether phase was washed three times with 300 ml. of water to neutrality, and then stripped of solvent by heating to 130° C. 49 grams of toluene were then added to the hydrolyzate to yield a 70.0 weight-percent solution of theoretical resin solids.

210 grams of the resin solution and 15 grams of water were then charged to a 300 ml. steel autoclave. The autoclave was sealed and heated at 250° C. for 12 hours. Following this, the autoclave was drained and excess water and toluene stripped to yield a resin solution having the following properties:

Solids content _____ weight-percent __ 74.7
Viscosity, 25° C _____ c.p.s __ 86
OH content of resin _____ weight-percent __ 1.53

A sample resin solution catalyzed with 0.1 weight-percent cobalt (as cobalt octasol) and 0.15 weight-percent 8-hydroxyquinoline of resin solids dried tack-free after heating for 5 hours at 150° C. A glass tape of 8 to 8.5 mils thickness on which the catalyzed silicone resin solution was impregnated and cured retained a dielectric strength greater than 1000 volts/ml. on both straight and bent sections of the tape after aging 14 days at 275° C. The catalyzed resin solution had a shelf life at 50° C. of 38 days.

*Example III*

A silicone hydrolyzate having the following composition: PhMeSiO, 50 mole-percent; MeSiO$_{3/2}$, 25 mole-percent; PhSiO$_{3/2}$, 25 mole-percent (R/Si ratio, 1.500; phenyl/methyl ratio, 1.000), was prepared by hydrolyzing a mixture of corresponding chlorosilane monomers by the "excess water" technique. The hydrolyzate was neutralized and stripped of solvent. Toluene was then added to the hydrolyzate to yield a 70.0 weight-percent solution of resin solids.

210 grams of the resin solution and 15 grams of water were then charged to a 300 ml. steel autoclave. The autoclave was sealed and heated at 270° C. (pressure: 1000 p.s.i.) for 12 hours. Following this, the autoclave was drained and excess water stripped to yield a resin solution having the following properties:

Solids content _____ weight-percent __ 70.5
Viscosity, 25° C _____ c.p.s __ 54
OH content of resin _____ weight-percent __ 2.0

A sample resin solution catalyzed with 0.02 weight-percent cobalt (as cobalt octasol) and 0.03 weight-percent 8-hydroxyquinoline of resin solids dried tack-free after heating for 1 hour at 150° C. A glass tape of 8 to 8.5 mils thickness on which the catalyzed silicone resin solution was impregnated and cured retained a dielectric strength greater than 1000 volts/ml. on both straight and bent sections of the tape after aging 14 days at 275° C. The catalyzed resin solution had a shelf life at 50° C. of 105 days.

*Example IV*

A silicone hydrolyzate having the following composition: $Me_2SiO$, 55 mole-percent; $MeSiO_{3/2}$, 10 mole-percent; $PhSiO_{3/2}$, 35 mole-percent (R/Si ratio, 1.550; phenyl/methyl ratio, 0.291), was prepared by hydrolyzing a mixture of corresponding chlorosilane monomers by the "excess water" technique. The hydrolyzate was neutralized and stripped of solvent. Toluene was then added to the hydrolyzate to yield a 70.0 weight-percent solution of resin solids.

210 grams of the resin solution and 15 grams of water were then charged to a 300 ml. steel autoclave. The autoclave was sealed and heated at 240° C. for 12 hours. Following this, the autoclave was drained and excess water stripped to yield a resin solution having the following properties:

Solids content _____ weight-percent __ 70.0
Viscosity, 25° C _____ c.p.s __ 50
OH content of resin _____ weight-percent __ 2.3

A sample resin solution catalyzed with 0.02 weight-percent cobalt (as cobalt octasol) and 0.03 weight-percent 8-hydroxyquinoline of resin solids dried tack-free after heating for 1 hour at 150° C. The catalyzed resin solution had a shelf life at 150° C. of 25 days.

*Example V*

A silicone hydrolyzate having the following composition: $PhMeSiO$, 52.5 mole-percent; $MeSiO_{3/2}$, 8 mole-percent; $PhSiO_{3/2}$, 39.5 mole-percent (R/Si ratio, 1.525; phenyl/methyl ratio, 1.320), was prepared by hydrolyzing a mixture of corresponding chlorosilane monomers by the "excess water" technique. The hydrolyzate was neutralized and stripped of solvent. Toluene was then added to the hydrolyzate to yield a 70.0 weight-percent solution of resin solids.

210 grams of the resin solution and 15 grams of water were then charged to a 300 ml. steel autoclave. The autoclave was sealed and heated at 245° C. for 12 hours. Following this, the autoclave was drained and excess water stripped to yield a resin solution having the following properties:

Solids content _____ weight-percent __ 70.0
Viscosity, 25° C _____ c.p.s __ 37
OH content of resin _____ weight-percent __ 1.5

A sample resin solution catalyzed with 0.02 weight-percent cobalt (as cobalt octasol) and 0.03 weight-percent 8-hydroxyquinoline of resin solids dried tack-free after heating for 5 hours at 150° C. The catalyzed resin solution had a shelf life at 50° C. of 6 months.

*Example VI*

A silicone hydrolyzate having the following composition: $PhMeSiO$, 25 mole-percent; $Me_2SiO$, 22.5 mole-percent; $MeSiO_{3/2}$, 12.5 mole-percent; $PhSiO_{3/2}$, 40 mole-percent (R/Si ratio, 1.475; phenyl/methyl ratio, 0.788), was prepared by hydrolyzing a mixture of corresponding chlorosilane monomers by the "excess water" technique. The hydrolyzate was neutralized and stripped of solvent. Toluene was then added to the hydrolyzate to yield a 65.0 weight-percent solution of resin solids.

210 grams of the resin solution and 15 grams of water were then charged to a 300 ml. steel autoclave. The autoclave was sealed and heated at 250° C. for 12 hours. Following this, the autoclave was drained and excess water and toluene stripped to yield a resin solution having the following properties:

Solids content _____ weight-percent __ 77.9
Viscosity, 25° C _____ c.p.s __ 88
OH content of resin _____ weight-percent __ 1.4

A sample resin solution catalyzed with 0.2 weight-percent cobalt (as cobalt octasol) and 0.03 weight-percent 8-hydroxyquinoline of resin solids dried tack-free after heating for 2 hours at 150° C. A glass tape of 8 to 8.5 mils thickness on which the catalyzed silicone resin solution was impregnated and cured retained a dielectric strength greater than 1000 volts/ml. on both straight and bent sections of the tape after aging 7 days at 275° C. The catalyzed resin solution had a shelf life at 50° C. of 7 months.

*Example VII*

A silicone hydrolyzate having the following composition: $Me_2SiO$, 45 mole-percent; $Ph_2SiO$, 5 mole-percent; $MeSiO_{3/2}$, 15 mole-percent; $PhSiO_{3/2}$, 35 mole-percent (R/Si ratio, 1.500; phenyl/methyl ratio 0.428), was prepared by hydrolyzing a mixture of corresponding chlorosilane monomers by the "excess water" technique. The hydrolyzate was neutralized and stripped of solvent. Toluene was then added to the hydrolyzate to yield a 65.0 weight-percent solution of resin solids.

210 grams of the resin solution and 15 grams of a 10 weight-percent solution of ammonia in water were then charged to a 300 ml. steel autoclave. The autoclave was sealed and heated at 200° C. for 9 hours. Following this, the autoclave was drained and excess water, ammonia and toluene stripped to yield a resin solution having the following properties:

Solids content _____ weight-percent __ 67.9
Viscosity, 25° C _____ c.p.s __ 61
OH content of resin _____ weight-percent __ 0.4

The catalyzed resin solution had a shelf life at 50° C. of 80 days.

*Example VIII*

A silicone hydrolyzate having the following composition: $Me_2SiO$, 45 mole-percent; $PhSiO$, 5 mole-percent; $MeSiO_{3/2}$, 15 mole-percent; $PhSiO_{3/2}$, 35 mole-percent (R/Si ratio, 1.500; phenyl/methyl ratio 0.428), was prepared by hydrolyzing a mixture of corresponding chlorosilane monomers by the "excess water" technique. The hydrolyzate was neutralized and stripped of solvent. Toluene was then added to the hydrolyzate to yield a 75.0 weight-percent solution of resin solids.

210 grams of the resin solution and 15 grams of a 10 weight-percent solution of ammonia in water were then charged to a 300 ml. steel autoclave. The autoclave was sealed and heated at 255° C. for 12 hours. Following this, the autoclave was drained and excess water and ammonia stripped. Toluene was then added to the solution to yield a resin solution having the following properties:

Solids content _____ weight-percent __ 55.0
Viscosity, 25° C _____ c.p.s __ 104
OH content of resin _____ weight-percent __ 0.6

An uncatalyzed sample of the resin solution dried tack-free after heating for 2 hours at 200° C. A glass tape of 8 to 8.5 mils thickness on which the silicone resin solution was impregnated and cured retained a dielectric strength greater than 1000 volts/ml. on both straight and bent sections of the tape after aging 14 days at 275° C. The uncatalyzed resin solution had a shelf life at 50° C. of 21 days.

What is claimed is:

1. The method for preparing a silicone resin of a predetermined hydroxyl content which comprises hydrolyzing and condensing at least one silane having monovalent hydrocarbon and readily-hydrolyzable radicals attached to the silicon atom thereof to a partially condensed hydroxyl-containing silicone hydrolyzate containing a ratio of monovalent hydrocarbon radicals to silicon atoms of from about 1.0 to about 1.7, sufficient water being employed in the hydrolysis to hydrolyze all the readily-hydrolyzable radicals, and heating a solution of said hydrolyzate in an inert solvent in the presence of water, said water being present in an amount of from about $1/11$ to about $1/4$ of the weight of hydrolyzate present, to a temperature of from at least about 150° C. to about 300° C. under a pressure of from at least about 400 p.s.i. to about 20,000 p.s.i., in order to simultaneously condense the silanol groups of said hydrolyzate to form Si—O—Si bonds and hydrolytically cleave the Si—O—Si bonds of said hydrolyzate to form Si—OH bonds, said heating being continued until equilibrium has been attained.

2. The method for preparing a silicone resin of a predetermined hydroxyl content which comprises hydrolyzing and condensing at least one silane having monovalent hydrocarbon and readily-hydrolyzable radicals attached to the silicon atom thereof to a partially condensed hydroxyl-containing silicone hydrolyzate containing a ratio of monovalent hydrocarbon radicals to silicon atoms of from about 1.0 to about 1.7, said hydrocarbon radicals consisting of only phenyl and methyl, sufficient water being employed in the hydrolysis to hydrolyze all the readily-hydrolyzable radicals, and heating a solution of said hydrolyzate in an inert solvent in the presence of water, said water being present in an amount of from about $1/11$ to about $1/4$ of the weight of hydrolyzate present, to a temperature of from at least about 150° C. to about 300° C. under a pressure of from at least about 400 p.s.i. to about 20,000 p.s.i., in order to simultaneously condense the silanol groups of said hydrolyzate to form Si—O—Si bonds and hydrolytically cleave the Si—O—Si bonds of said hydrolyzate to form Si—OH bonds, said heating being continued until equilibrium has been attained.

3. The method for preparing a silicone resin of a predetermined hydroxyl content which comprises hydrolyzing and condensing at least one silane having monovalent hydrocarbon and chlorine radicals attached to the silicon atom thereof to a partially condensed hydroxyl-containing silicone hydrolyzate containing a ratio of monovalent hydrocarbon radicals to silicon atoms of from about 1.0 to about 1.7, sufficient water being employed in the hydrolysis to hydrolyze all the chlorine radicals, neutralizing said hydrolyzate, and heating a solution of said hydrolyzate in an inert solvent in the presence of water, said water being present in an amount of from about $1/11$ to about $1/4$ of the weight of hydrolyzate present, to a temperature of from at least about 150° C. to about 300° C. under a pressure of from at least about 400 p.s.i. to about 20,000 p.s.i., in order to simultaneously condense the silanol groups of said hydrolyzate to form Si—O—Si bonds and hydrolytically cleave the Si—O—Si bonds of said hydrolyzate to form Si—OH bonds, said heating being continued until equilibrium has been attained.

4. The method for preparing a silicone resin of a predetermined hydroxyl content which comprises hydrolyzing and condensing at least one silane having monovalent hydrocarbon and chlorine radicals attached to the silicon atom thereof to a partially condensed hydroxyl-containing silicone hydrolyzate containing a ratio of monovalent hydrocarbon radicals to silicon atoms of from about 1.0 to about 1.7, said hydrocarbon radicals consisting of only methyl and phenyl, sufficient water being employed in the hydrolysis to hydrolyze all the chlorine radicals, neutralizing said hydrolyzate, and heating a solution of said hydrolyzate in an inert solvent in the presence of water, said water being present in an amount of from about $1/11$ to about $1/4$ of the weight of hydrolyzate present, to a temperature of from at least about 150° C. to about 300° C. under a pressure of from at least about 400 p.s.i. to about 20,000 p.s.i., in order to simultaneously condense the silanol groups of said hydrolyzate to form Si—O—Si bonds and hydrolytically cleave the Si—O—Si bonds of said hydrolyzate to form Si—OH bonds, said heating being continued until equilibrium has been attained.

5. The method for preparing a silicone resin of a predetermined hydroxyl content which comprises hydrolyzing and condensing at least one silane having monovalent hydrocarbon and chlorine radicals attached to the silicon atom thereof to a partially condensed hydroxyl-containing silicone hydrolyzate containing a ratio of monovalent hydrocarbon radicals to silicon atoms of from about 1.0 to about 1.7, sufficient water being employed in the hydrolysis to hydrolyze all the chlorine radicals, washing a solution of said hydrolyzate in an inert solvent with water, refluxing said solution with water, removing excess water by distillation, and heating a solution of said hydrolyzate in an inert solvent in the presence of water, said water being present in an amount of from about $1/11$ to about $1/4$ of the weight of hydrolyzate present, to a temperature of from at least about 150° C. to about 300° C. under a pressure of from at least about 400 p.s.i. to about 20,000 p.s.i., in order to simultaneously condense the silanol groups of said hydrolyzate to form Si—O—Si bonds and hydrolytically cleave the Si—O—Si bonds of said hydrolyzate to form Si—OH bonds, said heating being continued until equilibrium has been attained.

6. The method for preparing a silicone resin of a predetermined hydroxyl content which comprises hydrolyzing and condensing at least one silane having monovalent hydrocarbon and chlorine radicals attached to the silicon atom thereof to a partially condensed hydroxyl-containing silicone hydrolyzate containing a ratio of monovalent hydrocarbon radicals to silicon atoms of from about 1.0 to about 1.7, said hydrocarbon radicals consisting of only methyl and phenyl, sufficient water being employed in the hydrolysis to hydrolyze all the chlorine radicals, washing a solution of said hydrolyzate in an inert solvent with water, refluxing said solution with water, removing excess water by distillation, and heating a solution of said hydrolyzate in an inert solvent in the presence of water, said water being present in an amount of from about $1/11$ to about $1/4$ of the weight of hydrolyzate present, to a temperature of from at least about 150° C. to about 300° C. under a pressure of from at least about 400 p.s.i. to about 20,000 p.s.i., in order to simultaneously condense the silanol groups of said hydrolyzate to form Si—O—Si bonds and hydrolytically cleave the Si—O—Si bonds of said hydrolyzate to form si—OH bonds, said heating being continued until equilibrium has been attained.

7. The method for preparing a silicone resin of a predetermined hydroxyl content which comprises hydrolyzing and condensing at least one silane having monovalent hydrocarbon and readily-hydrolyzable radicals attached to the silicon atom thereof to a partially condensed hydroxyl-containing silcone hydrolyzate containing a ratio of monovalent hydrocarbon radicals to silicon atoms of from about 1.0 to about 1.7, sufficient water being employed in the hydrolysis to hydrolyze all the readily-hydrolyzable radicals, and heating a solution of said hydrolyzate in an inert solvent in the presence of water and ammonia, said water being present in an amount of from about 1/11 to about 1/4 of the weight of hydrolyzate present, to a temperature of from at least about 150° C. to about 300° C. under a pressure of from at least about 400 p.s.i. to about 20,000 p.s.i., in order to simultaneously condense the silanol groups of said hydrolyzate to form Si—O—Si bonds and hydrolytically cleave the Si—O—Si bonds of said hydrolyzate to form Si—OH bonds, said heating being continued until equilibrium has been attained.

8. The method for preparing a silicone resin of a predetermined hydroxyl content which comprises hydrolyzing and condensing at least one silane having monovalent hydrocarbon and readily-hydrolyzable radicals attached to the silicon atom thereof to a partially condensed hydroxyl-containing silicone hydrolyzate containing a ratio of monovalent hydrocarbon radicals to silicon atoms of from about 1.0 to about 1.7, said hydrocarbon radicals consisting of only phenyl and methyl, sufficient water being employed in the hydrolysis to hydrolyze all the readily-hydrolyzable radicals, and heating a solution of said hydrolyzate in an inert solvent in the presence of water and ammonia, said water being present in an amount of from about 1/11 to about 1/4 of the weight of hydrolyzate present, to a temperature of from at least about 150° C. to about 300° C. under a pressure of from at least about 400 p.s.i. to about 20,000 p.s.i., in order to simultaneously condense the silanol groups of said hydrolyzate to form Si—O—Si bonds and hydrolytically cleave the Si—O—Si bonds of said hydrolyzate to form Si—OH bonds, said heating being continued until equilibrium has been attained.

9. The method for preparing a silicone resin of a predetermined hydroxyl content which comprises hydrolyzing and condensing at least one silane having monovalent hydrocarbon and chlorine radicals attached to the silicon atom thereof to a partially condensed hydroxyl-containing silicone hydrolyzate containing a ratio of monovalent hydrocarbon radicals to silicon atoms of from about 1.0 to about 1.7, sufficient water being employed in the hydrolysis to hydrolyze all the chlorine radicals, neutralizing said hydrolyzate, and heating a solution of said hydrolyzate in an inert solvent in the presence of water and ammonia, said water being present in an amount of from about 1/11 to about 1/4 of the weight of hydrolyzate present, to a temperature of from at least about 150° C. to about 300° C. under a pressure of from at least about 400 p.s.i. to about 20,000 p.s.i., in order to simultaneously condense the silanol groups of said hydrolyzate to form Si—O—Si bonds and hydrolytically cleave the Si—O—Si bonds of said hydrolyzate to form Si—OH bonds, said heating being continued until equilibrium has been attained.

10. The method for preparing a silicone resin of a predetermined hydroxyl content which comprises hydrolyzing and condensing at least one silane having monovalent hydrocarbon and chlorine radicals attached to the silicon atom thereof to a partially condensed hydroxyl-containing silicone hydrolyzate containing a ratio of monovalent hydrocarbon radicals to silicon atoms of from about 1.0 to about 1.7, said hydrocarbon radicals consisting of only methyl and phenyl, sufficient water being employed in the hydrolysis to hydrolyze all the chlorine radicals, neutralizing said hydrolyzate, and heating a solution of said hydrolyzate in an inert solvent in the presence of water and ammonia, said water being present in an amount of from about 1/11 to about 1/4 of the weight of hydrolyzate present, to a temperature of from at least about 150° C. to about 300° C. under a pressure of from at least about 400 p.s.i. to about 20,000 p.s.i. in order to simultaneously condense the silanol groups of said hydrolyzate to form Si—O—Si bonds and hydrolytically cleave the Si—O—Si bonds of said hydrolyzate to form Si—OH bonds, said heating being continued until equilibrium has been attained.

11. The method for preparing a silicone resin of a predetermined hydroxyl content which comprises hydrolyzing and condensing at least one silane having monovalent hydrocarbon and chlorine radicals attached to the silicon atom thereof to a partially condensed hydroxyl-containing silicone hydrolyzate containing a ratio of monovalent hydrocarbon radicals to silicon atoms of from about 1.0 to about 1.7, sufficient water being employed in the hydrolysis to hydrolyze all the chlorine radicals, washing a solution of said hydrolyzate in an inert solvent with water, refluxing said solution with water, removing excess water by distillation, and heating a solution of said hydrolyzate in an inert solvent in the presence of water and ammonia, said water being present in an amount of from about 1/11 to about 1/4 of the weight of hydrolyzate present, to a temperature of from at least about 150° C. to about 300° C. under a pressure of from at least about 400 p.s.i. to about 20,000 p.s.i., in order to simultaneously condense the silanol groups of said hydrolyzate to form Si—O—Si bonds and hydrolytically cleave the Si—O—Si bonds of said hydrolyzate to form Si—OH bonds, said heating being continued until equilibrium has been attained.

References Cited in the file of this patent

UNITED STATES PATENTS

| | | |
|---|---|---|
| 2,483,209 | Lamoreaux | Sept. 27, 1949 |
| 2,507,200 | Elliot et al. | May 9, 1950 |
| 2,568,384 | Cheronis | Sept. 18, 1951 |
| 2,607,792 | Warrick | Aug. 19, 1952 |
| 2,679,495 | Bunnell | May 25, 1954 |
| 2,779,776 | Hyde et al. | Jan. 29, 1957 |
| 2,863,897 | Wehrly | Dec. 9, 1958 |